United States Patent [19]

Hertel et al.

[11] 4,328,142

[45] May 4, 1982

[54] PREPARATION OF WATER-SOLUBLE CONDENSATES AND THEIR USE AS CROSSLINKING AGENTS FOR THE PREPARATION OF PAPERMAKING AIDS

[75] Inventors: Otto Hertel; Emil Scharf; Jaroslav Melzer, all of Ludwigshafen, Fed. Rep. of Germany

[73] Assignee: BASF Aktiengesellschaft, Ludwigshafen, Fed. Rep. of Germany

[21] Appl. No.: 225,241

[22] Filed: Jan. 15, 1981

[30] Foreign Application Priority Data

Feb. 1, 1980 [DE] Fed. Rep. of Germany ....... 3003648

[51] Int. Cl.$^3$ .............................................. C08L 63/00
[52] U.S. Cl. .................................. 523/417; 162/164 R; 162/164 EP; 525/420; 525/430; 528/421
[58] Field of Search ................ 260/29.2 EP, 29.2 N; 528/421; 162/164 EP, 164 R; 525/420, 430

[56] References Cited

U.S. PATENT DOCUMENTS 2,849,411 8/1958 Lehmann et al. ........... 260/29.2 EP
3,215,654 11/1965 Schmalz ...................... 260/29.2 EP
3,947,383 3/1976 Baggett ....................... 260/29.2 EP

FOREIGN PATENT DOCUMENTS 1156516 6/1969 United Kingdom .
1213745 11/1970 United Kingdom .
1509967 5/1978 United Kingdom .

OTHER PUBLICATIONS

Epoxy Resins, Chemistry and Technology, 1973, p. 55; May et al., Marcel Dekker Inc. N.Y.

*Primary Examiner*—Theodore E. Pertilla
*Attorney, Agent, or Firm*—Oblon, Fisher, Spivak, McClelland & Maier

[57] ABSTRACT

A process for the preparation of water-soluble polymeric crosslinking agents by a two-stage reaction of di-secondary diamines with epichlorohydrin and/or dichlorohydrin, wherein, in the first stage, di-secondary diamines are condensed with epichlorohydrin and/or dichlorohydrin in a molar ratio of from 1:0.5 to 1:1 at a pH of from 9 to 12, and in the second stage the condensates obtained in the first stage are reacted with additional epichlorohydrin and/or dichlorohydrin at a pH of from 4 to 8.5. The water-soluble condensates thus obtained are crosslinking agents for polyamines, polyamidoamines, ethyleneimine-modified polyamidoamines and polyether-amines. The crosslinking reaction gives water-soluble condensates, which possess a high cation activity and may be used as retention aids, drainage aids and flocculants in the manufacture of paper.

3 Claims, No Drawings

PREPARATION OF WATER-SOLUBLE CONDENSATES AND THEIR USE AS CROSSLINKING AGENTS FOR THE PREPARATION OF PAPERMAKING AIDS

It is known to use polyethyleneimine as a papermaking and boardmaking aid to accelerate drainage and to fix pigments, very fine fibers and other anionic additives in the paper. However, polyethyleneimine can only be used as a papermaking aid at a neutral or slightly acid pH. Products have therefore been developed which can be employed as drainage aids and retention aids even at an acid pH. For example, products of this type are prepared by reacting polyamines with epichlorohydrin, cf. German Laid-Open Application DOS No. 1,570,296. Further, it is known that retention aids and drainage aids can be prepared by crosslinking polyamidoamines with epichlorohydrin. Whilst crosslinked polyamines display the best effect at a neutral pH, the maximum effect of crosslinked polyamidoamines is displayed in the acid pH range.

German Laid-Open Application DOS No. 1,795,392 discloses a process for the preparation of water-soluble crosslinked polyamidoamines, wherein polyamidoamines are reacted with difunctional crosslinking agents which are prepared by reacting bis-tert.-amines or secondary amines with epichlorohydrin. The water-soluble, crosslinked polyamidoamines thereby obtained are used as flocculants, flotation agents and retention aids in papermaking and as assistants in the purification of sewage containing suspended matter. Because of the presence of quaternary nitrogen atoms, the effectiveness, as paper auxiliaries, of the water-soluble crosslinked polyamidoamines thus obtained is not entirely satisfactory.

German Laid-Open Application No. DOS 2,434,816 discloses a process for the preparation of nitrogen-containing condensates, wherein polyamidoamines, to which ethyleneimine may or may not have been grafted, are reacted with α,ω-chlorohydrin ethers of polyalkylene oxides of 8 to 100 alkylene oxide units until products which only just remain water-soluble are formed. These products are very efficient as paper auxiliaries both at an acid pH and at neutral pH, but have a relatively low cation activity. On the other hand, to protect the environment it is necessary, in papermaking, to reduce, as far as possible, the amount of fresh water required per kg of paper produced. Hence, there is a progressive move toward employing closed water circuits in papermaking machinery. This leads, for example, to a build-up of a very high content of fines, and also to a build-up of soluble interfering substances in the papermaking water circuit. In turn, this leads, for example, to drainage problems and also to a deterioration in the quality of the paper produced. The paper auxiliaries which have hitherto proved of value in industrial operation cannot always solve the problems which arise with closed water circuits in papermaking machinery.

It is an object of the present invention to provide crosslinking agents, based on water-soluble condensates and products having a high cation activity and optimum efficiency at an acid pH, as retention aids and drainage aids for papermaking.

We have found that this object is achieved, according to the invention, in the process described at the outset, by reacting di-secondary diamines with epichlorohydrin and/or dichlorohydrin in a two-stage reaction, wherein, in the first stage, di-secondary diamines are condensed with eipchlorohydrin and/or dichlorohydrin in a molar ratio of from 1:0.5 to 1:1, at a pH of from 9 to 12, and, in the second stage, the condensate obtained in the first stage is reacted with from 1 to 70 parts by weight of epichlorohydrin and/or dichlorohydrin, per 100 parts by weight of the condensate from the first stage, at a pH of from 4 to 8.5.

The crosslinking agents which are prepared by two-stage condensation of di-secondary diamines with epichlorohydrin and/or dichlorohydrin can quite generally be used as crosslinking agents for the production of water-soluble cationic resins, which have a high cation activity and are nevertheless effective paper auxiliaries at an acid pH or neutral pH. They may be used, for example, to crosslink polyamines, polyamidoamines, ethyleneimine-modified polyamidoamines or polyetheramines. Examples of suitable polyamines are diethylenetriamine, ethylenediamine, triethylenetetramine, dipropylenetriamine, tripropylenetetramine, tetraethylenepentamine and polyethyleneimines which contain up to 1,000 ethyleneimine units.

Polyamidoamines are prepared by reacting dicarboxylic acids of 4 to 10 carbon atoms with polyalkylenepolyamines containing from 3 to 10 basic nitrogen atoms per molecule. Examples of suitable dicarboxylic acids are succinic acid, maleic acid, adipic acid, glutaric acid, suberic acid, sebacic acid and terephthalic acid. The polyamidoamines may also be prepared from mixtures of dicarboxylic acids, for example mixtures of adipic acid and glutaric acid, or maleic acid and adipic acid. The use of adipic acid is however preferred. The dicarboxylic acids are condensed with polyalkylenepolyamines, or mixtures of polyalkylenepolyamines, which contain from 3 to 10 basic nitrogen atoms per molecule, for example diethylenetriamine, triethylenetetramine, tetraethylenepentamine, dipropylenetriamine, tripropylenetetramine or dihexamethylenetriamine. The amines may contain up to 10% by weight of a diamine, eg. ethylenediamine or hexamethylenediamine. The condensation of the dicarboxylic acids with the polyalkylenepolyamines is preferably carried out in the absence of a solvent, but can also be carried out in a solvent which is inert toward the reactants. The condensation reaction temperature is from 80° to 200° C. The water formed during the reaction is distilled from the system. The condensation can also be carried out in the presence of lactones or lactams of carboxylic acids of 5 to 12 carbon atoms, in which case these compounds become incorporated into the polyamidoamine molecule. From 0.8 to 1.4 moles of polyalkylenepolyamine are employed per mole of dicarboxylic acid.

Particularly efficient retention aids and drainage aids, possessing a particularly high cation activity, are obtained by grafting ethyleneimine onto the polyamidoamines. The ethyleneimine-modified polyamidoamines are prepared by grafting ethyleneimine onto the polyamidoamines in the presence of a Lewis acid, for example boron trifluoride etherate, or sulfuric acid. From 20 to 400, preferably from 50 to 300, parts by weight of ethyleneimine are used per 100 parts by weight of polyamidoamine in the grafting reaction. Polyamidoamines and ethyleneimine-modified polyamidoamines are disclosed, for example, in German Laid-Open Application DOS No. 2,434,816. Polyamines which are useful for the preparation of paper auxiliaries are described in German Laid-Open Application DOS No. 1,570,296.

Polyether-amines are compounds which are prepared by, for example, reacting aliphatic polyamines as described in German Laid-Open Application DOS No. 1,570,296 with polyepihalohydrins containing from 2 to 30 halomethyl radicals. Polyether-amines are also obtained by converting polyglycols containing from 2 to 100, preferably from 8 to 50, ethylene oxide units to the corresponding $\alpha,\omega$-dichlorohydrin ethers by reaction of the terminal OH groups with epichlorohydrin, and then reacting these ethers with polyamines, ammonia or amines.

To crosslink compounds of the classes described above, condensates obtained by a two-stage reaction of di-secondary diamines with epichlorohydrin and/or dichlorohydrin are employed. Suitable di-secondary diamines are piperazine, C-alkylated piperazines, eg. 2,6-dimethylpiperazine, 2,5-dimethylpiperazine, 2-ethylpiperazine and 2-phenylpiperazine, bis-piperazinoethylene and N,N'-dialkylalkylenediamines, eg. N,N'-dimethylethylenediamine, N,N'-dimethyl-1,3-propylenediamine, N,N'-diethylethylenediamine and N,N'-dipropylethylenediamine. The use of piperazine is preferred, because this gives products having a particularly high cation activity.

The di-secondary diamines are reacted with epichlorohydrin and/or dichlorohydrin. This reaction is carried out in two stages; in the first reaction stage, the condensation is carried out at a pH of from 9 to 12, to form a primary condensation product, in which the molar ratio of di-secondary diamine to epichlorohydrin or dichlorohydrin is from 1:0.5 to 1:1. The reaction of these compounds to give the polymeric crosslinking agents which, according to the invention, are used to produce the water-soluble resins may be carried out in the absence of a solvent, or in an organic solvent, or in water or a mixture of water and organic solvents.

Organic solvents used are preferably water-miscible compounds, for example $C_1$–$C_4$-alcohols, glycol, glycerol, polyethylene glycol and partially or completely etherified glycols and polyglycols.

The reaction is carried out at from 20° to 180° C., preferably from 40° to 100° C. If the temperature used is above the boiling point of the particular solvent employed, the reaction is carried out under pressure. In the first reaction stage, the pH of the reaction mixture is from 9 to 12, preferably from 9.5 to 10.5. since HCl is liberated during the reaction, the pH gradually drops as the reaction progresses. In the first reaction stage, a condensate is produced at a pH above 9; the condensation can be stopped by lowering the pH of the viscous solution to below 7. To maintain the pH at from 9 to 12 during the condensation it is necessary to add an inorganic base, for example sodium hydroxide, potassium hydroxide, calcium hydroxide, calcium oxide, sodium carbonate, potassium carbonate or calcium carbonate. Advantageously, the reaction in this first stage is carried out by adding an equimolar amount of sodium hydroxide solution (or of some other inorganic base) dropwise, at the same time as the epichlorohydrin, in an amount such that a pH of from 9 to 12 is maintained, or by introducing the total amount of inorganic base at the start, by adding it to the amine.

In the second stage, an epichlorohydrin and/or dichlorohydrin adduct is formed at the free NH groups present at the chain ends of the primary condensate, at a pH of from 4 to 8.5.

In the second stage, the pH is adjusted by adding acid to the reaction mixture. A pH of from 4.0 to 8.5, preferably from 5.5 to 18, is required for this second stage. Either organic acids, such as formic acid, acetic acid, propionic acid, oxalic acid or toluenesulfonic acid, or inorganic acids, such as sulfuric acid or hydrochloric acid, may be used to adjust the pH. Per mole of the oligomer or high molecular weight condensate produced in the first reaction stage, not less than 2, and preferably from 2 to 3, moles of epichlorohydrin or dichlorohydrin are required. Accordingly, in the second stage the condensate obtained in the first stage is reacted with additional difunctional crosslinking agent (epichlorohydrin or dichlorohydrin). From 1 to 70, preferably from 10 to 60, parts by weight of epichlorohydrin and/or dichlorohydrin are required per 100 parts by weight of the condensate obtained in the first stage. It is possible to employ mixtures of epichlorohydrin and dichlorohydrin in the first and second stages of the condensation, or epichlorohydrin in the first stage and dichlorohydrin the the second stage, or vice versa. The polymeric crosslinking agents obtained are water-soluble, the viscosity of a 20% strength by weight aqueous solution being from 5 to 1,000 mPa.s, preferably from 10 to 100 mPa.s (measured at 20° C.).

The polyamines, polyamidoamines (which may or may not be grafted with ethyleneimine) or polyetheramines are crosslinked in aqueous solution with the above condensates of di-secondary diamines and epichlorohydrin and/or dichlorohydrin. The reaction temperature is from 20° to 200° C., preferably from 40° to 100° C. At above 100° C., the reaction is carried out in a pressure vessel. The concentration of the crosslinked resin solutions in water may vary within a wide range, for example from 1 to 50% by weight. The concentration of these solutions is preferably so chosen that the crosslinked resin solutions formed have a solids content of from 5 to 30% by weight.

The ratio of polymeric crosslinking agent to the compounds to be reacted therewith can also be varied within a wide range, only limited by the need to obtain water-soluble compounds. Per part by weight of a polyamine, polyamidoamine (which may or may not be grafted with ethyleneimine) or polyether-amine, from 0.01 to 5, preferably from 0.1 to 2, parts by weight of polymeric crosslinking agent are used. The condensation may be carried out continuously or batchwise. To prepare the water-soluble, nitrogen-containing condensates, a suitable procedure is, for example, to introduce the compounds to be crosslinked into a reaction vessel, add about 10% of the polymeric crosslinking agent, heat the reaction mixture to 40°–100° C. and add more polymeric crosslinking agent, continuously or in portions, as it is consumed. However, an alternative procedure is to mix the polymeric crosslinking agent and the compound to be crosslinked and to heat the mixture slowly to the reaction temperature. Yet another procedure is first to introduce 5–15% of a mixture of polymeric crosslinking agent and compound to be crosslinked into the reaction vessel, heat this mixture to the reaction temperature and then introduce the remainder of the mixture of polymeric crosslinking agent and compound to be crosslinked, as the reaction proceeds. The polymeric crosslinking agent and the compound to be crosslinked can also be introduced separately into the reaction zone. Yet another possible procedure is first to introduce the polymeric crosslinking agent into the reaction vessel and to add the compound to be crosslinked, with or without further solvent. If the viscosity of the reaction mixture rises excessively during the condensation, so that the reactants can no longer be mixed easily, the reaction mixture must be diluted by adding a solvent, preferably water.

Preferably, the retention aids and drainage aids for the paper industry are produced by condensing the ethyleneimine-grafted polyamidoamines, described above, with the polymeric crosslinking agents according to the invention.

The condensation reaction is complete after from about 30 minutes to 15 hours, depending on the reaction conditions, ie. the temperature, the degree of condensation of the reactants, and the solvent used. The condensation is taken to a stage where the water-soluble high molecular weight resins obtained have a viscosity, measured in 20% strength aqueous solution at 20° C., of not less than 300 mPa.s, preferably from 400 to 2,500 mPa.s. The course of the crosslinking reaction can easily be followed by taking samples of the reaction mixture and determining their viscosity under defined conditions. The crosslinking reaction takes place at a pH above 7, preferably at from 7.5 to 12.

The water-soluble, nitrogen-containing condensates obtained are used as retention aids, flocculants and drainage aids in papermaking. For this purpose, the reaction mixture may be used direct or after dilution with water. The condensate is added to the paper stock in an amount of from 0.01 to 0.3% by weight, based on dry fiber.

In the Examples, parts, and percentages are by weight, unless stated otherwise. The products prepared according to the invention are tested as drainage aids in comparison with conventional aids. The drainage acceleration was characterized in terms of the reduction in the freeness, in °SR. The Schopper-Riegler freeness was determined in accordance with the method given in leaflet 107 of the Verein der Zellstoff- und Papierchemiker und Ingenieure. Unless stated otherwise, the viscosity data given were determined on 20% strength by weight aqueous solutions at 20° C., using a Haake rotary viscometer, with a shear gradient of 49 sec$^{-1}$ at viscosities below 1,000 mPa.s and of 24.5 sec$^{-1}$ at above 1,000 mPa.s.

The filler retention was measured in terms of the ash content of paper sheets which had been prepared by means of a Rapid-Köthen apparatus as described in leaflet 108 of the Verein der Zellstoff- und Papierchemiker und Ingenieure.

The cation activity of water-soluble cationic polyelectrolytes can be determined by means of a special polyelectrolyte titration, cf. D. Horn, Prog. Colloid and Polymer Science, 65 (1978), 251-264.

PREPARATION OF POLYAMIDOAMINES

Polyamidoamine 1

100 parts of diethylenetriamine, 50 parts of water and 140 parts of adipic acid are mixed in a vessel which can be heated and is equipped with a stirrer, thermometer and descending condenser. As soon as the adipic acid has dissolved, the clear solution is heated over 3 hours to 190° C. under nitrogen. In the course thereof, the added water first of all distils off, as does the water formed during the condensation reaction. After a condensation time of 4 hours at 190° C., the melt is cooled under 10 mbar to 130° C. At this temperature, 200 parts of water are added to the very viscous polyamidoamine. An aqueous resin solution is obtained, having a solids content of 50.9% (determined by drying 0.5 g of resin solution for 2 hours at 120° C. in a drying oven), and a viscosity of 1,361 mPa.s (measured at 25° C. by the falling ball method, in a Höppler viscometer). Based on 100% strength resin, the acid number is 3.74 and the basic nitrogen content 6.2%. A 1% strength solution of resin in 2% strength aqueous sodium chloride solution has a specific viscosity of 0.16 at 25° C.

Polyamidoamine 2

(ethyleneimine-modified polyamidoamine)

500 parts of the 50.9% strength aqueous solution of the polyamidoamine 1 (about 250 parts of the 100% strength material) are introduced into a reaction vessel, equipped with a stirrer, reflux condenser and thermometer, 10 parts of p-toluenesulfonic acid are added and the mixture is heated to 65° C. In the course of 3 hours, 500 parts of a 50% strength aqueous solution of ethyleneimine is added dropwise. Immediately after this addition, the temperature of the reaction solution rises, and is kept at from 80° to 90° C. After completion of the addition of the ethyleneimine, the reaction mixture is kept at 80° C. for a further 2 hours, and is then diluted with 990 parts of water. An about 25% strength solution of the ethyleneimine-modified polyamidoamine 2 is obtained.

EXAMPLE 1

(a) Preparation of crosslinking agent 1

First, an aqueous solution of a polymeric crosslinking agent is prepared by heating 215.35 parts of piperazine, in the form of a 50% strength aqueous solution, to 88° C., and adding 208.2 g of epichlorohydrin, in the form of a 50% strength solution in methanol, dropwise thereto, at the same temperature, in the course of 45 minutes. The molar ratio of piperazine to epichlorohydrin in the first stage is accordingly 1:0.9. 50% strength aqueous NaOH is added as required, so as to maintain the pH of the solution at from 10 to 10.5. After keeping the reaction mixture at 80°-90° C. for a further 1½ hours, hydrochloric acid is added to bring the pH to 5.5, and 108 parts of epichlorohydrin, in the form of a 50% strength solution in methanol, are then introduced in the course of 2 minutes. A reaction time of 2 hours is then allowed, during which the methanol is distilled off continuously. An aqueous solution is obtained, which is diluted, by addition of water, to a polymer content of 20% (calculated salt-free and acid-free). During the addition of the epichlorohydrin in the second reaction stage, the pH is 5.5. The 20% strength aqueous solution of the crosslinking agent 1 has a viscosity of 200 mPa.s at 20° C.

(b) Preparation of a crosslinked polyamidoamine (resin 1)

100 parts of a 20% strength aqueous solution of the polyamidoamine 1 are heated to 60° C. and 54.4 parts of the 20% strength aqueous solution of the above crosslinking agent 1 are added in the course of 120 minutes, at 60° C. The mixture is allowed to react for a further hour. Accordingly, the crosslinking reaction requires 3 hours at 60° C. An aqueous solution of a nitrogen-containing condensate is obtained; a 20% strength solution of the condensate in water has a viscosity of 800 mPa.s at 20° C. After completion of the condensation, the pH of the resin solution obtained is brought from 11 to 8 by adding formic acid. The resin is used as a retention aid and drainage aid.

EXAMPLE 2

(a) Preparation of crosslinking agent 2

To prepare a polymeric crosslinking agent, 215.35 parts of piperazine in the form of a 50% strength aqueous solution are heated to 88° C. and 208.2 parts of epichlorohydrin are added in the course of 45 minutes. During the addition of the epichlorohydrin, the pH of the reaction mixture must be kept at from 9 to 9.5, and for this purpose 116 parts of a 50% strength aqueous sodium hydroxide solution are added. The molar ratio of piperazine to epichlorohydrin in the 1st reaction stage is 1:0.9. After addition of the epichlorohydrin, the reaction mixture is kept at 90° C. for a further 90 minutes and is then brought to a pH of 7.5 by adding hydrochloric acid. Thereafter, 50 parts of epichlorohydrin are added in the course of 1 minute and the mixture is kept at 90° C. for a further hour. The polymeric crosslinking agent (2) obtained is thereupon diluted to a polymer content of 20% by adding water. This solution has a viscosity of 185 mPa.s at 20° C.

(b) Preparation of a crosslinked, ethyleneimine-grafted, polyamidoamine (resin 2)

100 parts of an aqueous solution, of 20% solids content, of the polyamidoamine 2 are heated to 60° C. and 45.5 parts of a 20% strength aqueous solution of the above crosslinking agent (2) are added in the course of 153 minutes. After a reaction time of 4 hours at 60° C., an aqueous solution of a nitrogen-containing condensate (resin 2) is obtained, and this is cooled and brought to pH 8 by adding formic acid. A 20% strength aqueous solution of resin 2 has a viscosity of 800 mPa.s at 20° C. The resin is used as a drainage aid and retention aid.

EXAMPLE 3

(a) Preparation of crosslinking agent 3

277 parts of epichlorohydrin, in the form of a 50% strength solution in methanol, are added dropwise, in the course of 1½ hours, to a 50% strength aqueous solution of 340 parts of piperazine, at from 80° to 90° C., whilst keeping the pH at from 10 to 10.5. The molar ratio of piperazine to epichlorohydrin in the 1st reaction stage is 1:0.75; the condensation of the epichlorohydrin with the piperazine is continued for 2 hours at 80° C. and the reaction mixture is then brought to a pH of 7 by adding concentrated hydrochloric acid. Thereafter, 180 parts of epichlorohydrin, in the form of a 50% strength solution in methanol, are added in the course of about 1 minute, following which the reaction mixture is kept at 90° C. for 2 hours. The methanol is then distilled off and the crosslinking agent (3) is diluted, by addition of water, to a polymer content of 20%. The ratio of piperazine to epichlorohydrin in this crosslinking agent is 1:1.25, and the viscosity of a 20% strength aqueous solution is 80 mPa.s at 20° C.

(b) Preparation of a crosslinked, ethyleneimine-grafted polyamidoamine (resin 3)

To prepare a retention aid and drainage aid, 100 parts of a 20% strength aqueous solution of the polyamidoamine resin 2 are heated to 60° C. and 36.3 parts of a 20% strength aqueous solution of the above crosslinking agent (3) are added in the course of 210 minutes. The condensation reaction is complete after an extra 240 minutes. A water-soluble, nitrogen-containing condensate is obtained, which as a 20% strength aqueous solution, at 20° C., has a viscosity of ~800 mPa.s. The pH of the resin solution is brought to 8 by adding formic acid (resin 3).

EXAMPLE 4

100 parts of a polyethyleneimine (viscosity of a 50% strength aqueous solution: about 15,000 mPa.s measured on a Brookfield viscometer at 20° C. and 20 rpm), in the form of a 20% strength aqueous solution, are introduced into a reaction vessel and heated to 60° C., and 20.5 parts of a 20% strength solution of the polymeric crosslinking agent (3) described in Example 3 are added in the course of 300 minutes. The condensation takes place over 350 minutes at 60° C. After this time, a 20% strength aqueous solution of the reaction product has a viscosity of 880 mPa.s at 20° C. The pH of the product is brought to 7. The condensate is used as a retention aid and drainage aid.

EXAMPLE 5

(a) Preparation of crosslinking agent 4

To prepare a polymeric crosslinking agent, 285 parts of an isomer mixture of 70 parts of 2,5-dimethylpiperazine and 30 parts of 2,6-dimethylpiperazine, in the form of a 50% strength aqueous solution, are heated to 80° C. and 208.2 parts of epichlorohydrin are added in the course of 45 minutes. (Molar ratio of dimethylpiperazine:epichlorohydrin = 1:0.9). The pH is kept at 10 during the condensation by adding NaOH. The mixture is kept at 80° C. for a further 45 minutes and its pH is then brought to 8.5 with hydrochloric acid.

129 parts of dichlorohydrin, in the form of a 50% strength aqueous solution, are then added in the course of 1 minute, and the mixture is diluted to 20% polymer content with water. The viscosity of this solution of crosslinking agent 4 is 290 mPa.s.

(b) Preparation of a crosslinked ethyleneimine-grafted polyamidoamine 100 parts of an aqueous solution, of 20% solids content, of polyamidoamine 2 are heated to 60° C. and 60 parts of the above crosslinking agent 4 are added in the course of 135 minutes. After a total reaction time of 195 minutes at 60° C., an aqueous solution of a crosslinked nitrogen-containing condensate (resin 5) is obtained, and this is cooled and brought to pH 8 by adding formic acid. The viscosity of a 20% strength aqueous solution of the resin at 20° C. is 735 mPa.s.

EXAMPLE 6

(a) Preparation of crosslinking agent 5

To prepare a polymeric crosslinking agent, 208.2 parts of epichlorohydrin are added, in the course of 60 minutes, to 220 parts of N,N'-dimethylethylenediamine, in the form of a 50% strength aqueous solution, at 95° C., the pH being kept at 9.8 during the reaction by addition of NaOH. (Molar ratio of diamine to epichlorohydrin = 1.:0.9). The mixture is left at 80°C. for a further 68 minutes and is then brought to pH 6 with sulfuric acid.

50 parts of epichlorohydrin are then added in the course of 1 minute and the mixture is kept at 80° C. for 1 hour, after which it is diluted to 20% polymer content. The viscosity of a 20% strength aqueous solution of the resulting crosslinking agent 5 is 282 mPa.s at 20° C.

(b) Preparation of a crosslinked polyamidoamine 100 parts of an aqueous solution, of 20% solids content, of polyamidoamine 2 are heated to 60° C. and 48.2 parts of the above crosslinking agent 5 are added in the course of 140 minutes. After a reaction time of 4 hours at 60° C., an aqueous solution of a polycondensate (resin 6) is obtained, which is cooled and brought to pH 8 by adding formic acid. A 20% strength aqueous solution of resin 6 has a viscosity of 1,380 mPa.s.

The resin is used as a retention aid and drainage aid.

COMPARATIVE EXAMPLE 1

(Example according to German Laid-Open Application DOS No. 2,434,816)

100 parts of a 20% strength aqueous solution of the polyamidoamine resin 2 are heated to 60° C. and crosslinked, by addition of 40.5 parts of a 20% strength aqueous solution of a crosslinking agent obtained by reacting a polyglycol ether of molecular weight 1,500 with 2.05 moles of epichlorohydrin, until the high molecular weight product has been formed. The crosslinking reaction requires 350 minutes. The condensate obtained after this period has a viscosity of 830 mPa.s as a 20% strength aqueous solution at 25° C.

COMPARATIVE EXAMPLE 2

A 20% strength aqueous solution of polyethyleneimine, containing about 100 ethyleneimine units per molecule and having a viscosity, as a 20% strength aqueous solution at 20° C., of 400 mPa.s, is tested as a drainage aid and retention aid.

COMPARATIVE EXAMPLE 3

100 parts of the 20% strength aqueous solution of polyethyleneimine, described in Example 4, are heated to 60° C. and crosslinked by adding 60.5 parts of a 20% strength aqueous solution of the crosslinking agent used in Comparative Example 1, in the course of 350 minutes.

TESTING THE TECHNICAL PROPERTIES OF THE RESINS PREPARED ACCORDING TO THE EXAMPLES AND COMPARATIVE EXAMPLES

The resins obtained according to the Examples and Comparative Examples are tested for their efficiency as drainage aids and retention aids. To characterize the drainage acceleration produced by the compounds, the reduction in the freeness, in ° SR, is measured on a fiber stock which has been obtained by pulping newsprint by means of an Ultraturrax apparatus. Table 1 shows the values obtained, each value given being the mean of 8 measurements. The measurements are carried out at pH 7.3 in the absence of alum, and at pH 4.8 in the presence of 1.5% of alum. The zero values are those found without addition of a resin to the stock.

TABLE 1

| Drainage efficiency test: | | | | |
|---|---|---|---|---|
| pH | 7.3 | | 4.8 | |
| zero value | 76° SR | | 70.3° SR | |
| amount of additive | 0.06% | 0.08% | 0.06% | 0.09% |
| resin according to Example | °SR | | °SR | |
| 1 | 56 | 51 | 60 | 59 |
| 2 | 56 | 52 | 57 | 56 |
| 3 | 56 | 51.5 | 58 | 57.5 |
| 4 | 56 | 51.5 | 62 | 61 |
| 5 | 56 | 52 | 59 | 57 |
| 6 | 56 | 51 | 56 | 56 |
| resin according to Comparative Example | | | | |
| 1 | 56 | 53 | 62 | 59 |
| 2 | 54 | 53 | 68 | 67 |
| 3 | 60 | 58 | 63 | 63 |

TABLE 2

The retention efficiency of the resins according to Examples 1 to 4 and according to Comparative Examples 1 to 3 was tested on a fiber stock consisting of 80% of bleached sulfite cellulose (beaten, 37°SR) and 20% of filler (China clay). The filler retention was measured with 0.015, 0.03 and 0.045% of resin added to the paper stock. The test was carried out at a pH of 6 (with 0.5% of alum added to the stock) and of 4.8 (with 1.5% of alum added to the stock).

| | | | | | | | Cation activity (measured as the consumption of Ca polyvinylsulfonate in mg per 5 ml of 20% strength resin solution) |
|---|---|---|---|---|---|---|---|
| pH of the fiber stock | | 6 | | | 4.8 | | |
| Amounts employed | 0.015 | 0.03 | 0.045 | 0.015 | 0.03 | 0.045 | |
| Retention, measured as % ash in the paper | | | | | | | |
| No resin added to the stock(blank) | | 3.4 | | | 3.8 | | |
| Addition of resin according to Example | | | | | | | |
| 1 | 8.1 | 9.4 | 10.5 | 7.8 | 9.0 | 10.8 | 1.28 |
| 2 | 7.6 | 8.5 | 10 | 7.6 | 8.1 | 8.5 | 2.20 |
| 3 | 7.6 | 8.3 | 10.1 | 7.7 | 8.5 | 9.3 | |
| 4 | 7.3 | 8.3 | 9.2 | 5.9 | 6.5 | 7.2 | |
| 5 | 7.8 | 8.6 | 9.9 | 7.1 | 9.0 | 8.9 | |
| 6 | 8.0 | 8.7 | 10.1 | 7.4 | 8.9 | 10.3 | |
| Addition of resin according to Comparative Example | | | | | | | |
| 1 | 7.5 | 8.6 | 9.8 | 6.7 | 6.9 | 8.4 | |
| 2 | 6.8 | 7.0 | 7.4 | 4.9 | 4.9 | 5.1 | 2.88 |

TABLE 2-continued

The retention efficiency of the resins according to Examples 1 to 4 and according to Comparative Examples 1 to 3 was tested on a fiber stock consisting of 80% of bleached sulfite cellulose (beaten, 37°SR) and 20% of filler (China clay). The filler retention was measured with 0.015, 0.03 and 0.045% of resin added to the paper stock. The test was carried out at a pH of 6 (with 0.5% of alum added to the stock) and of 4.8 (with 1.5% of alum added to the stock).

|   |     |     |     |     |     |     | Cation activity (measured as the consumption of Ca polyvinylsulfonate in mg per 5 ml of 20% strength resin solution) |
|---|-----|-----|-----|-----|-----|-----|---|
| 3 | 7.5 | 8.7 | 9.1 | 7.5 | 8.2 | 8.8 | 0.64 |

We claim:

1. A process for the preparation of water-soluble condensates, wherein di-secondary diamines are reacted with epichlorohydrin and/or dichlorohydrin in an aqueous reaction, in which, in the first stage, di-secondary diamines are condensed with epichlorohydrin and/or dichlorohydrin in a molar ratio of from 1:0.5 to 1:1 at a pH of from 9 to 12 by the addition of a base, and, in the second stage, the condensate obtained in the first stage is reacted with from 1 to 70 parts by weight of epichlorohydrin and/or dichlorohydrin, per 100 parts by weight of the condensate from the first stage, at a pH of from 4 to 8.5, wherein the product obtained in the second stage is reacted with a polyamine, polyamidoamine, ethyleneimine-modified polyamidoamine or polyether-amine in aqueous solution at up to 200° C., to form a water-soluble resin.

2. A process as claimed in claim 1, wherein piperazine is used as the di-secondary diamine.

3. A process as claimed in claim 1, wherein from 0.01 to 5 parts by weight of the polymeric crosslinking agent are employed per part by weight of polyamine, polyamidoamine, ethyleneimine-modified polyamidoamine or polyether-amine.

* * * * *